Patented Jan. 22, 1935

1,988,915

UNITED STATES PATENT OFFICE 1,988,915

METHOD OF MELTING GLASS

Walter W. Oakley, Corning, N. Y., assignor to Corning Glass Works, Corning, N. Y., a corporation of New York No Drawing. Application February 23, 1933
Serial No. 658,235

3 Claims. (Cl. 49—77)

This invention relates to a method of melting glass and more particularly to protecting the melting container from injury and the glass from contamination through the disintegration of the container.

Some glasses are difficult and expensive to make on account of their destructive effect on refractories, thus, for example, the fluorine-containing glasses such as fluoride opals are very corrosive to pot clays and it is not unusual that a pot is eaten through by the first melt of a fluoride opal. Glasses of high lead content are also destructive although in this case the effect is probably largely due to the hydrostatic pressure of the heavy thinly fluid metal which causes drilling or boring through the pot bottom. Other glasses which cause rapid deterioration and early failure of melting pots and refractories are those containing a high barium content. In all cases the effect is more pronounced on the bottom of the pot or melting container.

The object of the present invention is to prevent the corrosion and disintegration of the bottoms of melting containers and improve the quality of the glass which is melted in them.

The above and other objects may be attained by practicing my invention which comprises forming on the bottom of the melting container a layer of extremely viscous glass having a specific gravity greater than that of the glass which is to be melted in the container and then making the desired melt on top of this viscous layer in the usual manner.

In practicing my invention a layer of glass about one inch deep is formed on the bottom of the pot or container preferably by filling in a sufficient amount of a mixture of cullet and hydrated aluminum oxide, the alumina amounting to about 20% by weight of the mixture. This mixture is allowed to melt down and then the regular batch is filled on top of it and the melting is conducted in the usual manner.

The alumina greatly increases the viscosity of the bottom layer of glass and increases to some extent the specific gravity thereof. It also causes saturation of this layer of glass with one of the major constituents of the refractory and thereby greatly reduces corrosion. The layer of glass thus formed is therefore relatively inert and immobile and has little or no tendency to penetrate the refractory or to diffuse upwardly into the superimposed melt of glass.

In order that my invention may be more readily understood I give the following example which is illustrative thereof. Fluoride opal glass cullet having the composition as calculated from the batch 65.0% $SiO_2$, 13.6% $Na_2O$, 10.4% PbO, .4% $B_2O_3$, 9.6% $Al_2O_3$, .4% CaO, .6% $SO_3$, 2.0% F was mixed with hydrated alumina in the proportion of 80% cullet and 20% alumina. About one-hundred pounds of this mixture was filled into the melting pot and allowed to melt down for about two or three hours. A layer of very viscous glass resulted. On top of this viscous layer the batch of the desired opal glass was filled and melted in the usual manner, such glass having the composition as calculated from the batch: 69.6% $SiO_2$; 5.0% $Na_2O$; 6.8% PbO; 13.5% $B_2O_3$; .9% $Al_2O_3$; 4.2% CaO and 5.0% F.

It will be obvious that in lieu of a mixture of cullet and alumina, I may also use a glass batch having a composition which will produce a glass having a specific gravity and viscosity higher than the melt which is to be made thereon.

For some purposes it may be desirable to melt an ordinary lime glass on top of a layer of heavier lead glass. For example, certain refractories have a tendency to cause the continuous formation of seeds in lime glass which is melted in contact therewith. In this case lead glass cullet having a higher specific gravity than the lime glass is mixed with about 20% of hydrated alumina and a layer of this mixture is melted down in the melting container before the lime glass is filled on top. The heavier lead glass, being thus rendered highly viscous, remains below the lime glass without serious diffusion therein and protects it against contamination from the refractory.

What I claim is:

1. The method of melting glass which includes mixing alumina with cullet, introducing onto the bottom of the melting container a layer of the mixture, fusing the mixture to produce a highly viscous layer and making the glass melt on top of the fused layer.

2. The method of melting fluorine containing glass which includes mixing alumina with fluorine containing cullet, introducing onto the bottom of the melting container a layer of the mixture, fusing the layer and melting the fluorine containing glass batch on top of the fused layer.

3. The method of melting fluorine containing glass which includes mixing alumina with fluorine containing glass cullet the specific gravity of which is higher than that of the glass which is to be melted, the alumina being about twenty percent by weight of the mixture, forming a layer of the mixture on the bottom of the melting container, fusing the layer and making the glass melt on top of the fused layer.

WALTER W. OAKLEY.